May 24, 1960  H. R. GREENLEE  2,937,698
PRESSURE TANK
Filed Nov. 10, 1954  5 Sheets-Sheet 1
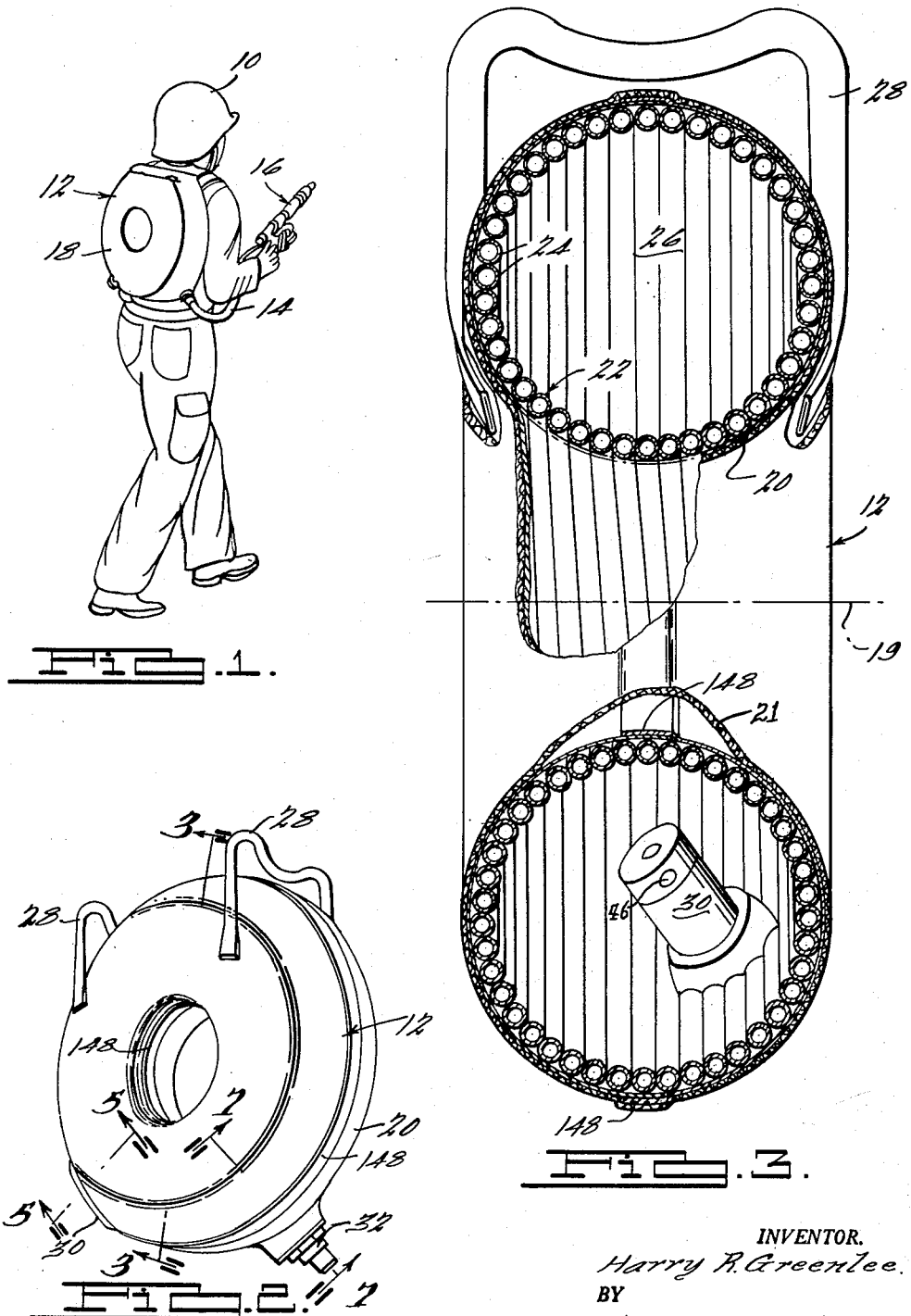
INVENTOR.
Harry R. Greenlee.
BY
Harness and Harris
ATTORNEYS.

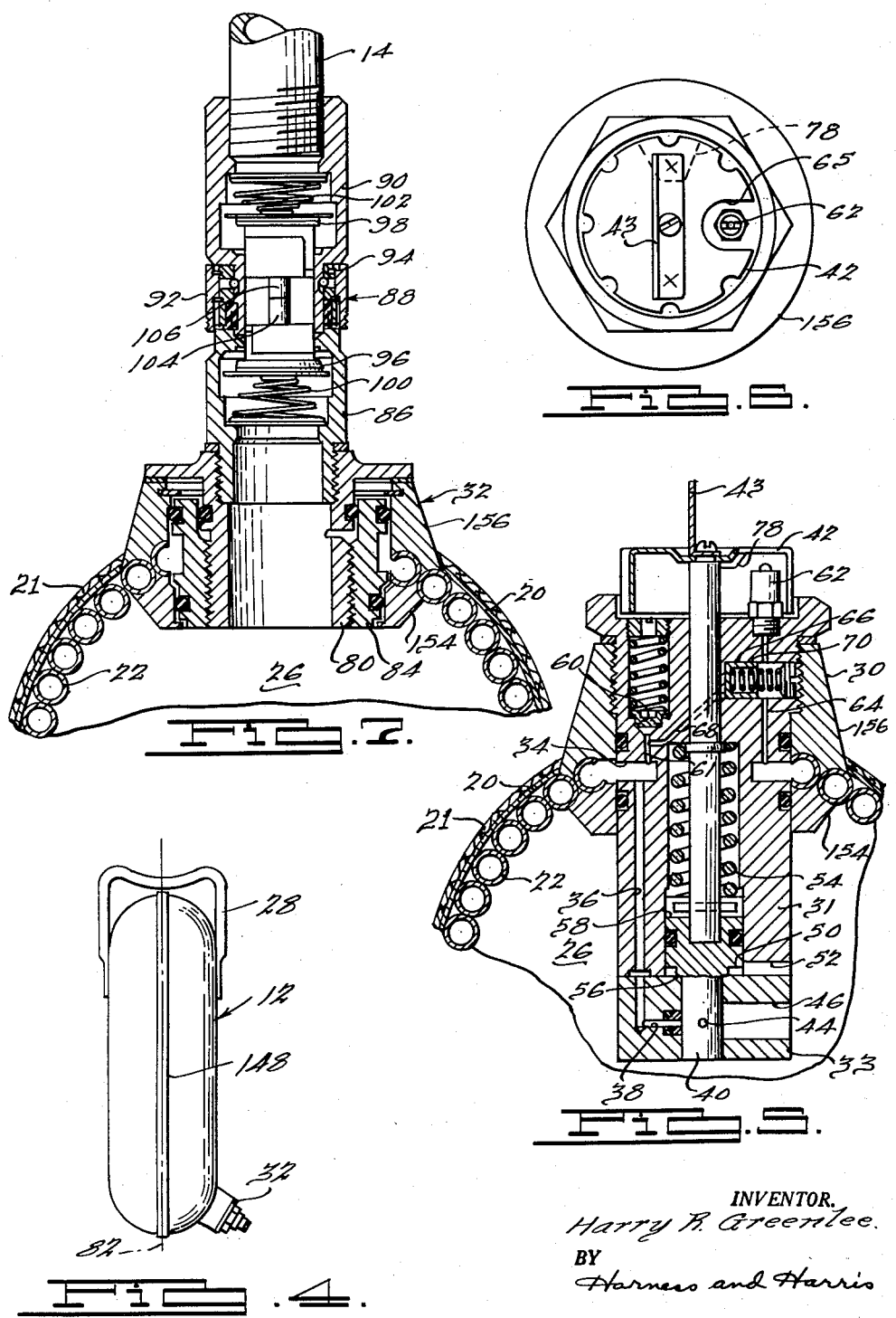

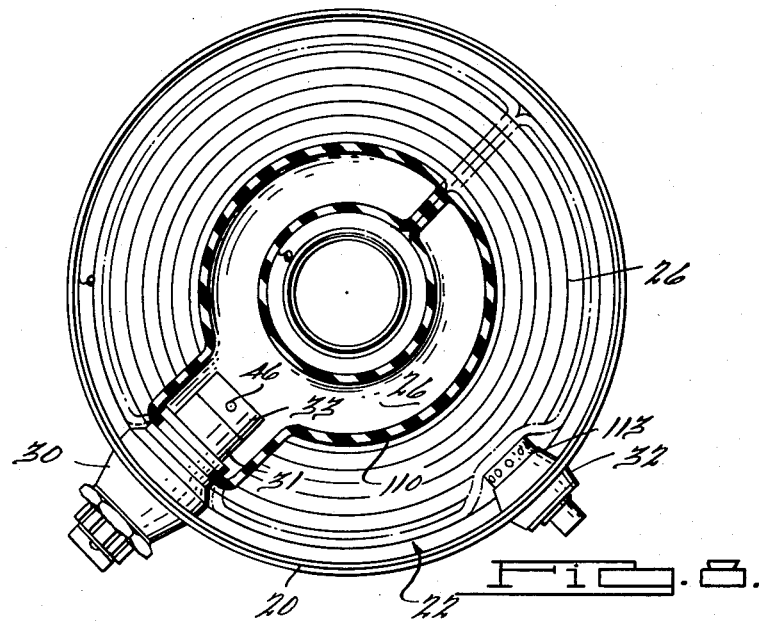
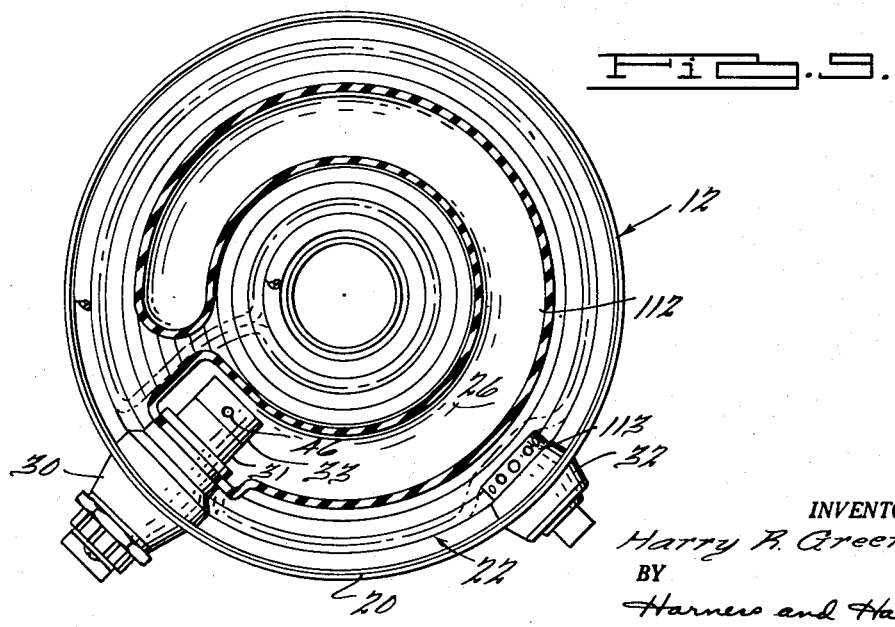

May 24, 1960 H. R. GREENLEE 2,937,698
PRESSURE TANK
Filed Nov. 10, 1954 5 Sheets-Sheet 4
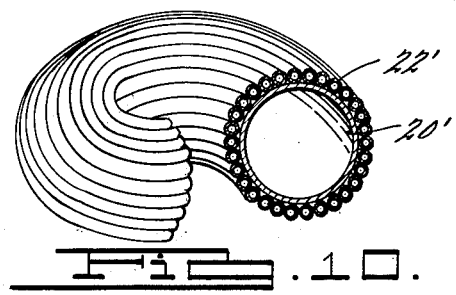
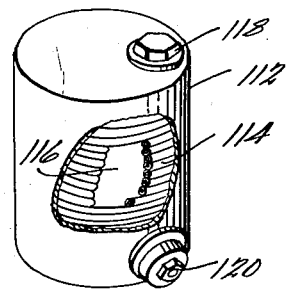
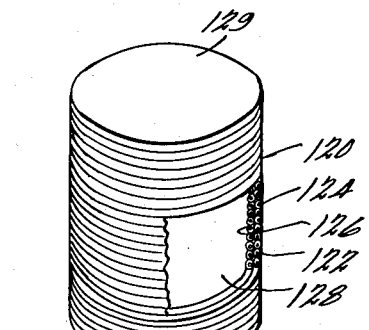
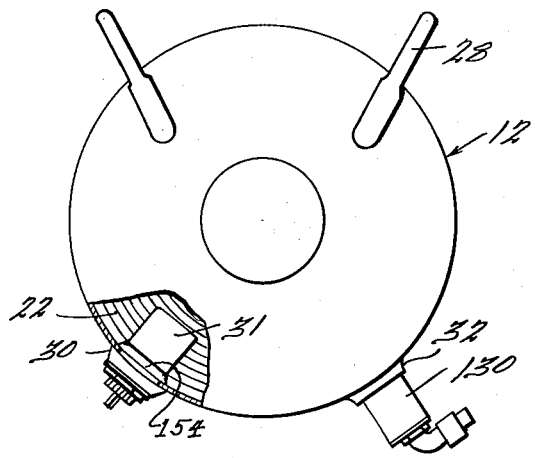
INVENTOR.
Harry R. Greenlee.
BY
Harness and Harris
ATTORNEYS May 24, 1960  H. R. GREENLEE  2,937,698
PRESSURE TANK
Filed Nov. 10, 1954  5 Sheets-Sheet 5
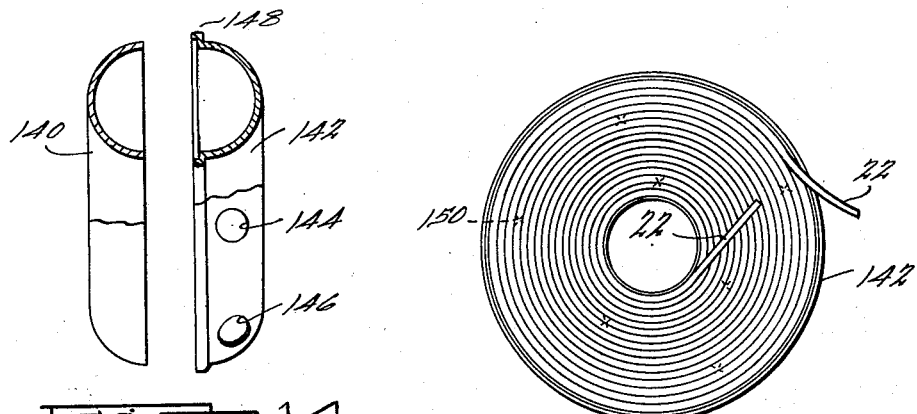
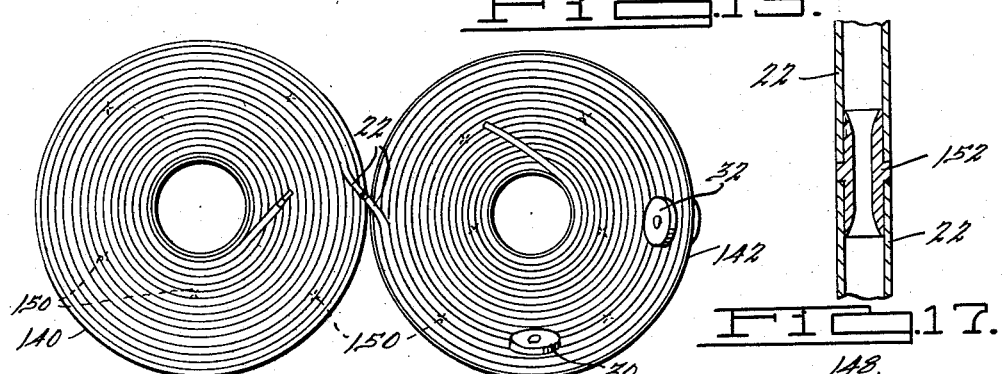
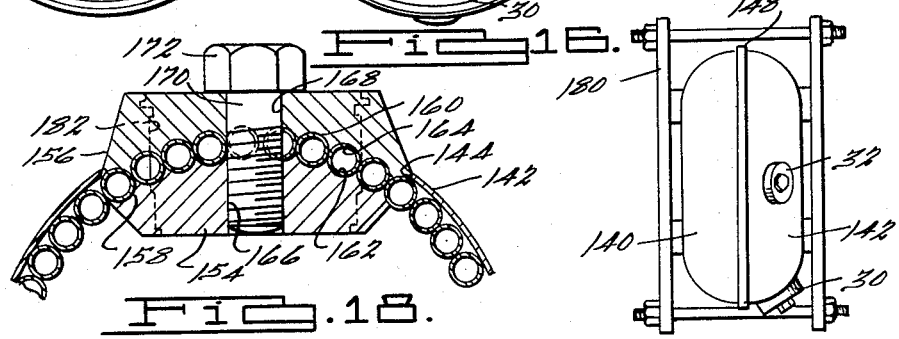
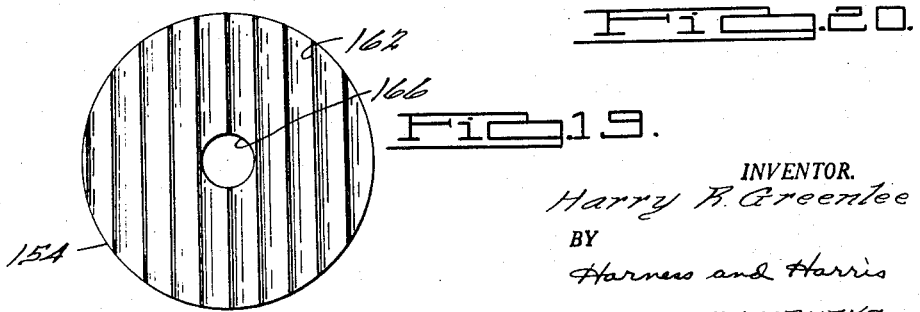
INVENTOR.
Harry R. Greenlee
BY
Harness and Harris
ATTORNEYS

United States Patent Office 2,937,698
Patented May 24, 1960

2,937,698
PRESSURE TANK

Harry R. Greenlee, Detroit, Mich., assignor to Chrysler Corporation, Highland Park, Mich., a corporation of Delaware Filed Nov. 10, 1954, Ser. No. 467,911

8 Claims. (Cl. 158—50.1)

This invention relates to a pressure tank and more particularly to a construction thereof and method of manufacture by means of which an economical pressure tank of large capacity and light weight is obtained.

It is a principal object of this invention to provide a pressure tank and means for manufacturing it such that it will be useful as an inexpensive, light weight tank for such uses as a container for oxygen or similar material, an accumulator for an air suspension for a vehicle, fire fighting equipment, an accumulator for a vehicle automatic transmission and a combined container and pressure tank for a military flame thrower. There are numerous other uses for pressure tanks and the above listed potential applications of this device are intended to be illustrative examples thereof rather than a comprehensive list of such applications. The pressure tank will be described herein as associated with a flame thrower which is used by the military as that is a typical application of the device.

It is an additional object of the invention to provide a practical and economical method of manufacturing a pressure tank.

It is a further object of the invention to utilize the combination of coils of tubing and a thin skinned wall structure and to integrally bond the tubing to the wall structure and to bond adjacent coils of tubing to each other so that the tubing and wall structure cooperate to form a pressure tank capable of withstanding pressures far in excess of the pressures which the wall structure alone could withstand.

It is also an object of the invention to provide a flexible bag within the pressure tank and to operatively connect the bag to the above mentioned tubing so that the bag may be expanded by the admission of fluid from said tubing to expel fluid from said tank. The flexible bag assures that the pressure tank may be rotated to any position without fear of bubbling the fluid from the tubing through the fluid to be expelled and without fear of the wrong fluid being discharged from the pressure tank.

It is an additional object of the invention to provide an improved flame thrower which can be tilted to any position without causing foaming of the napalm.

It is also an object of this invention to provide a flame thrower of simplified construction that lends itself to camouflage so that the soldier equipped with a flame thrower more nearly resembles an ordinary infantryman.

It is also an object of this invention to provide a portable flame thrower of compact design and light weight.

In the drawings:

Fig. 1 is a perspective view of a soldier equipped with a portable flame throwing device which utilizes a pressure tank incorporating my invention;

Fig. 2 is a perspective view of one form of a pressure tank made in accordance with my invention;

Fig. 3 is a vertical section of the pressure tank taken on the line 3—3 of Fig. 2 and has a portion of the wall structure broken away;

Fig. 4 is a side elevation of the pressure tank illustrated in Fig. 2;

Fig. 5 is a sectional view taken on the line 5—5 of Fig. 2 and illustrating a fitting including a pressure regulator valve used to control the discharge of fluid from the tubing to the internal cavity of the pressure tank;

Fig. 6 is a top plan view of the fitting illustrated in Fig. 5;

Fig. 7 is a sectional view taken on the line 7—7 of Fig. 2 and illustrating a fitting adapted for use as a combined inlet for the admission of fluid to the internal cavity of the tank and as an outlet for the discharge of fluid from the internal cavity of the pressure tank;

Fig. 8 is a sectional view of a modified pressure tank showing the use of a flexible bag therein;

Fig. 9 is a view similar to Fig. 8, but showing a slightly different form of flexible bag;

Fig. 10 illustrates a modified form of pressure tank in which the tubing is located on the outside of the wall structure;

Fig. 11 is a perspective view of another form of pressure tank with a portion of the outer wall broken away;

Fig. 12 is a perspective view of a modified form of pressure tank in which a plurality of concentric rows of tubing are used and the outer walls illustrated in the Fig. 3 and Fig. 11 forms of the invention are omitted;

Fig. 13 illustrates a modification in which a pressure regulator is provided at the outlet from the pressure tank so that the fluid may be discharged from the pressure tank at some predetermined pressure other than the pressure existing within the pressure tank; and Figs. 14 through 20 are diagrammatic views illustrating the method of manufacture of the pressure tank illustrated in Fig. 2.

A portable flame thrower has been selected as a typical application of my device in which the benefits to be derived from the use thereof are readily apparent. I contemplate coiling tubing in tightly wound concentric rings so that this tubing may be used as the pressure vessel for the air, or its equivalent, which heretofore has usually been contained in a separate tank. In addition, I braze the adjacent loops of tubing to each other and to a relatively thin wall structure or to additional coils of tubing to provide the wall structure of a pressure vessel adapted to hold napalm, or other fluid. In this way the tubing contributes to the structural strength of the walls defining the napalm pressure tank and containers for both the air and napalm are thus provided in a single relatively small, lightweight package.

In the description herein I will refer to air as the fluid contained in the tubing and I will refer to napalm as the fluid contained in the internal cavity of the pressure tank although it is to be understood that I have selected these fluids for illustration only and that other fluids could be used in the pressure tank without departing from my invention.

Referring to Fig. 1 it will be seen that a soldier 10 is equipped with flame throwing apparatus which includes a pressure tank 12 which is strapped to his back and connected by a conduit 14 to a flame throwing gun 16. The gun 16 may be of conventional construction and a description thereof will not be included herein. The pressure tank 12 is illustrated in Fig. 1 as enclosed within a fabric covering 18 which is merely for convenience and camouflage reasons. The pressure tank 12 is illustrated in Fig. 2 as it would appear if removed from the fabric covering 18. The size of the pressure tank is a critical factor in the flame thrower application of my invention for the width of the pressure tank should not exceed the width of a soldier's body and the thickness must be kept at a minimum so that the center of gravity will not be located too far back of the soldier's back lest it make it difficult for the soldier to stand erect.

The pressure tank 12, as illustrated in Figs. 1 through 7, is formed in the shape of a torus having an axis 19 and includes an outer wall structure 20 formed of relatively light weight metal. The wall structure 20 is preferably covered with an insulating and shockproofing material 21 which is adapted to protect the pressure tank from stones and to act as a heat insulator to prevent a pressure build up within the tank due to exposure thereof to sunlight etc. Tubing 22 of circular cross section is coiled within the wall structure 20 in successive rings 24 which are arranged in abutting relationship with the wall structure and with adjacent rings abutting each other. The wall structure 20 and tubing 22 are illustrated as made of metal although other substances such as various well-known plastics, could be used in some applications of the invention. Each ring of tubing is integrally bonded to its adjacent rings and to the wall structure in a manner to be described herein so that the tubing, in addition to providing an internal fluid passage, serves to strengthen the wall structure 20. The tubing 22 and wall structure 20 cooperate to form the effective wall structure of the pressure tank 12 and they cooperate to form an internal cavity 26 of toroidal shape which, in the flame thrower application of the device, is adapted to contain napalm while the tubing 22 contains air under pressure for use in expelling the napalm from the pressure tank.

A pair of legs 28 are illustrated in Figs. 2 and 3 as secured to the wall structure 20 by welding. They serve as legs for supporting the tank during transport thereof and, in addition, they serve as handles for lifting the pressure tank and are adapted to cooperate with straps for use in carrying the pressure tank on the soldier's back.

A fitting 30 including a pressure regulating device is illustrated in Fig. 2 as installed on the lower portion of the tank 12. This device is illustrated in greater detail in Fig. 5 and controls the discharge of air from tubing 22 to the internal cavity 26 of pressure tank 12, which contains napalm in the flame thrower application of the device. Similarly, a fitting 32 is illustrated in Fig. 2 as carried by the lower portion of the pressure tank 12. This fitting 32, is illustrated in greater detail in Fig. 7 and illustrated in Fig. 4 as located forwardly of the center line of the pressure tank.

Referring to Fig. 5 a section of the fitting including a pressure regulating device 30 is illustrated. The pressure regulating device includes body members 31 and 33, which are threaded into inner and outer members 154 and 156 which are referred to in greater detail herein in connection with Fig. 18. The body member 31 has a circumferential passage 34 which is in fluid flow communication with the interior of tubes 22 so that air under pressure in the tubes 22 is admitted to the passage 34. Air under pressure which is admitted to the circumferential passage 34 travels longitudinally of the body members 31 and 33 in a passage 36 which is formed therein and which is in fluid flow communication with a passage 38 formed in body member 33. Passage 38 is normally blocked by a valve stem 40 which is rotatably mounted within the body members 31 and 33. The valve stem 40 can be turned by the operator by manipulation of a control knob 42 and when the valve stem 40 is rotated ninety degrees an opening 44 which extends laterally therethrough is aligned with passage 38 so that air is admitted to the internal cavity 26 of the pressure tank through passage 46 provided in body member 33. There is thus provided a manual means of selectively admitting air under pressure to the internal cavity 26 of the pressure tank. A member 43 is preferably carried by control knob 42 to indicate the position of valve stem 40 by sight or touch.

In addition to a manual control for selectively admitting air under pressure to the internal cavity 26 it is desirable to provide means for regulating the admission of air so that a predetermined air pressure may be maintained in the internal cavity 26. To this end the valve stem 40 is mounted in body members 31 and 33 for axial movement under the influence of air pressure which is admitted to the space below an enlarged portion 50 on the valve stem through a passage 52 provided in the body member 31. A spring 54 is provided in the body member to oppose movement of the valve stem and if, for example, the air under pressure in the tubes 22 is under a pressure of about 2000 pounds per square inch and if the spring 54 is preselected so that it will yield and accommodate axial movement of the valve stem when about 350 pounds per square inch of pressure is present in the internal cavity 26 of the pressure tank then when a pressure in excess of 350 pounds per square inch is present in cavity 26 the valve stem will move axially until the opening 44 in the valve stem is no longer in fluid flow communication with the passage 38 and the admission of air under pressure from tubes 22 to the internal cavity 26 is interrupted. However, should the pressure within the internal cavity 26 drop below the selected value of the spring 54 the valve stem will be axially returned by the spring 54 and if the valve stem is in the proper rotary position the opening 44 will be aligned with the passage 38. Additional air will then be admitted under a pressure of 2000 pounds per square inch from the tubing 22 to the internal cavity 26 until the pressure in cavity 26 exceeds 350 pounds per square inch. Suitable abutments 56 and 58 are provided on the valve stem to limit the axial movement thereof.

A conventional pressure relief valve is provided at 60 to limit the pressure in tubes 22 to a predetermined maximum value and this valve is in fluid flow communication with the circumferential passage 34 through a passage 61 in body member 31.

A valve 62 which resembles a heavy duty valve used on automobile tires is provided on body member 31 and is connected to the circumferential passage 34 by means of a passage 64. An opening 65 is provided in control knob 42 to provide access to valve 62. A suitable source of air under pressure may be connected to valve 62 and the tubes 22 filled with air to a predetermined pressure established by relief valve 60. A supplemental safety valve 66 is preferably installed in the body member 31 and connected with the relief valve 60 by means of a passage 68. The safety valve 66 includes a movable piston 70 which is opposed by a spring 72 and adapted to block passage 64 in the event that the pressure in the air tubes has exceeded the predetermined pressure established by the relief valve 60, but air is being introduced at a rate greater than the rate at which the relief valve 60 is capable of dissipating it. The pressure within air tubes 22 may be exhausted by opening valve 62 and, if desired, the control knob 42 may be provided with an internal depending cam surface 78 which will open valve 62 when the handle is moved to a predetermined position.

Fig. 7 illustrates a fitting 32 which serves as an outlet for fluid such as napalm carried within the internal cavity 26 of the pressure tank 12 and, in addition, it serves as a means for admitting a new charge of the napalm. The fitting 32 includes a central apertured body member 80, inner and outer body members 154 and 156 which are referred to in greater detail herein in connection with Fig. 18 and an intermediate body member 84. Quick disconnect couplers are available commercially and a quick disconnect coupler 88 is threadably mounted on the central body member 80. The coupler 88 includes a stationary body portion 86 which is threaded into the central apertured body member 80 and it includes a cooperating body member 90 which is secured to the flexible tubing 14 which extends to the flame gun previously mentioned herein in connection with Fig. 1. The pressure tank 12 may thus be disconnected from the flame gun 16 and its flexible tube 14 by operation of the quick disconnect means. A detailed description of the quick disconnect device 88 is not believed to be necessary in view of the commercial availability of such devices although it may briefly be mentioned that axial movement of a collar 92 releases a plurality of locking balls 94 so that the body members 86 and 90 may be readily separated. The body members 86 and 90 respectively carry sealing valve elements 96 and 98 which are urged to a seated, valve closed position in the respective body elements by springs 100 and 102. Abutments 104 and 106 carried by the valve elements 96 and 98 open the valves when the body members 86 and 90 are coupled together. When the conduit 14 is coupled to tank 12 as illustrated in Fig. 7 there is provided an outlet for napalm and the discharge of napalm therethrough is controlled by operation of the gun 16 in the conventional manner.

When it is necessary to refill the pressure tank with napalm the quick disconnect body member 90 may be removed from the pressure tank 12 and a similar quick disconnect body member carried by a napalm supply tank may be connected to body member 96 so that napalm is forced under pressure into the pressure tank. If, however, in the field it is necessary to fill the pressure tank by gravity feed this may be accomplished by removing the central apertured body member 80 from the pressure tank 12 thereby providing a large opening through which napalm may be funneled.

It should be noted that fittings 30 and 32 are, as illustrated in Fig. 4, located forwardly of a central vertical plane 82 extending through the pressure tank 12. This is desirable for two reasons. The first of these reasons will become evident during a description of the method of manufacture of the pressure tank and relates to the fact that the fittings are applied before the two portions of the tank are bonded together. The other reason is that it is desirable to have the outlet fitting 32 located as close as possible to the soldier's back so that if he should assume a horizontal position the air within the pressure tank internal cavity 26 will rise to the then upper portion of the pressure tank 12, but it will still not be adjacent the fitting 32. It, of course, would be undesirable for air to be discharged instead of napalm when the gun 16 is fired.

Figs. 8 and 9 illustrate a modification of the device in which two forms of a flexible bag are illustrated. In Fig. 8 a flexible bag 110 extends around the internal cavity 26 of pressure tank 12 and is connected to pressure regulating device 30 so that when air is admitted to the interior of the flexible bag 110 from the tubes 22 and passage 46 the bag is extended from a first, relaxed condition shown in solid lines in Fig. 8 to a second, extended condition shown in dotted lines in Fig. 8. In the second or dotted line position the bag 110 substantially fills the internal cavity 26. The expansion of bag 110 effects the discharge of napalm from the internal cavity 26 through the fitting 32.

Fig. 9 illustrates a modified form of flexible bag 112 which may be provided although the devices of Figs. 8 and 9 are similar in other regards and in both the Fig. 8 and Fig. 9 form of the invention a cage 113 is provided on the inner end of fitting 32 to prevent the bag from blocking off the discharge of napalm through fitting 32.

Fig. 10 illustrates a modified form of pressure tank in which tubing 22' is coiled about the exterior of a toroidal wall structure 20'. The tubing is integrally bonded to the wall structure and adjacent coils of the tubing are integrally bonded to each other as in the Fig. 1 through 7 form of the device and in other respects this device is similar to the device illustrated in Figs. 1 through 7. It is intended that the fittings 30 and 32 be applied to this device although they are not illustrated in the figure.

Fig. 11 illustrates a modified form of pressure tank in which a wall structure 112 has a cylindrical form and tubing 114 is coiled within the wall structure 112 and bonded thereto. Adjacent coils of tubing are bonded to each other in a manner similar to that illustrated in Figs. 1 through 7. The pressure tank in this form of the invention has a cylindrical cavity 116 instead of a toroidal cavity 26 as illustrated in Figs. 1 through 7 although it should be noted that both the cylindrical cavity of the Fig. 11 form and the toroidal cavity of the Figs. 1 through 7 form have circular cross sections of substantially uniform diameter throughout the extent thereof. Fittings 118 and 120 may be applied to the pressure tank in the same manner that fittings 30 and 32 are applied in Figs. 5 and 7.

Fig. 12 illustrates a further modification in which the wall structure is omitted and a cylindrical pressure tank 120 is formed by coiling tubing 122 in a plurality of layers 124 and 126. The respective adjacent coils of tubing and the respective layers of tubing are integrally bonded to each other to form the wall of the pressure tank 120 and to define a cylindrical internal cavity 128. Suitable sheet metal end plates 129 may be bonded to the tubing if required and fittings like 30 and 32 may be used, if desired. The use of plural layers of tubing to form the pressure tank is not restricted to a cylindrical contour, however.

Fig. 13 illustrates a modification of the invention in which a double step down in pressure is used. It will be noted that in the Figs. 1 through 7 form of the invention that air in the tubing 22 was under a pressure of about 2000 lbs. per square inch, for example, and that it passed through a pressure regulating device designated by the numeral 30 to create a pressure of about 350 lbs. per square inch in the internal cavity 26 to expel fluid from this cavity to the atmosphere. The Fig. 13 form of the invention differs only in that a second pressure regulating device 130 is used at the discharge fitting 32 so that the fluid under pressure in internal cavity 26 may be discharged at a selected pressure controlled by the pressure regulating device 130. The discharge pressure may thus be preselected at some value between atmospheric pressure and the pressure maintained in the internal cavity 26. The device 130 can be constructed in the same manner as the pressure regulating device 30 illustrated in Fig. 5.

Figs. 14 through 20 illustrate a preferred method of manufacture of the pressure tank described above. Referring to Fig. 14 it will be noted that a pair of sections of a torus designated by the numerals 140 and 142 are formed from thin sheet metal. The section 142 is preferably provided with a pair of spaced openings 144 and 146 which are intended to ultimately receive the fittings 30 and 32. In addition, the section 142 has slightly offset edges 148 which are adapted to overlap the corresponding edges of the section 140 to accommodate a joinder between the sections 140 and 142. The offset edges 148 are also visible in Fig. 3.

Tubing 22 is then coiled in closely wound coils over the entire inner surface of each of the sections 140 and 142 as illustrated in Figs. 15 and 16. The winding may proceed from either the internal periphery or the external periphery of the sections 140 and 142, as desired. It has been found desirable to intermittently tack weld the tubing to the wall structure of the section 140 or 142 as indicated by the reference numeral 150. This intermittent tack welding is desirable to hold the tubing in place as it is wound into the section 140 or 142. If desired, the winding may be accomplished by the use of a master guide attached to a lathe, but since this utilizes well-known shop practices it has not been illustrated.

Fig. 16 illustrates the next step which contemplates cutting the tubing to length and providing a fluid flow connection between the outer end of the tubing of each section 140 or 142 and a corresponding connection for the inner ends of the tubing of sections 140 and 142. A small drilled insert or manifold 152, which is illustrated in Fig. 17, is inserted in the end of the tubing associated with the outer periphery of each of the sections 140 and 142 and a similar small manifold 152 is inserted in the ends of the tubing associated with the inner periphery of each of the sections 140 and 142. The tubing in the two sections then provides an uninterrupted and endless circuitous path.

The next step involves the provision of means for mounting fittings 30 and 32 in the openings 144 and 146 provided in the section 142 as illustrated in Fig. 14. The method of providing for the mounting of each of these fittings is similar and, therefore, in Fig. 18 an illustration is made in connection with the opening 144 although it is to be understood that an identical procedure should be followed in connection with the opening 146. An inner circular member 154 and an outer circular member 156 are provided with a diameter corresponding to the diameter of the opening 144 and the inner member 154 is provided with a convex contoured surface 158 while the outer member 156 is provided with a concave contoured surface 160. The terms concave and convex are used in a general sense for the surfaces 158 and 160 are provided with a plurality of parallel grooves 162 and 164, respectively as illustrated in Fig. 19 which is a plan view of the inner circular member 154. These grooves each have an arc of curvature corresponding to the outer surface of the rows of tubing 22 coiled within the section 142. The grooves may be hobbed, milled or cast to fit the tubes. The inner member 154 and the outer member 156 are provided with registering threaded openings 166 and 168 which are adapted to receive the threaded shaft 170 of a bolt 172 by means of which the members 154 and 156 are bolted in place in opening 144. It should be appreciated that it is necessary to drill a hole through the tubing to permit the shaft 170 of bolt 172 to penetrate it.

The sections 140 and 142 are then centered and clamped together with the inner and outer offset edges or flanges 148 overlapping the peripheral edge of the section 140 as illustrated in Fig. 3. A diagrammatic clamp is illustrated at 180 in Fig. 20. The entire assembly is then oven brazed into one integral structure with the tubing thus being brazed to the wall structure of its associated section 140 or 142 and with adjacent, abutting coils of the tubing being brazed to each other. In addition, the section 140 is brazed to the section 142 in the region of the flanges 148 and the inner circular member 154 and the outer circular member 156 associated with each of the openings 144 and 146 are brazed to the tubing which they contact.

After the brazing is completed the bolt 172 is removed and a boring machine is used to cut through the outer circular member 156, the inner circular member 154 and the tubing 22 to provide an opening indicated by dotted lines and designated by the numeral 182 in Fig. 18. The opening 182 may be threaded and machined until it assumes the desired shape to receive its respective fittings 30 or 32 as illustrated in Figs. 5 and 7. Chips which fall into the internal cavity 26 during machining may be removed by conventional shop practice such as flushing the cavity with air or liquid under pressure.

What is claimed is:

1. A pressure tank comprising a thin sheet wall structure defining a closed container, a layer of tubing coiled in abutting relationship with said wall structure over substantially the entire surface area of the inner side of said wall structure, said tubing being arranged in successive, abutting rings, said tubing throughout a major portion of its length being integrally bonded to said inner side of said wall structure and adjacent, abutting rings of said tubing being integrally bonded to each other throughout a major portion of their length so that the structural strength of said bonded rings of tubing contribute to the ability of the container to withstand internal pressure, fitting means to accommodate the admission of fluid under pressure to the interior of said tubing, pressure regulating means to accommodate the controlled discharge of fluid from within said tubing to the interior of said container and fitting means to accommodate the discharge of fluid from said container to the exterior thereof.

2. A pressure tank comprising a torus formed of thin sheet material and having a central axis, a layer of tubing coiled within said torus in abutting relationship with substantially the entire internal surface of said torus, said tubing being arranged in successive and abutting rings each of which is concentric with respect to said axis, said tubing throughout a major portion of its length being integrally bonded to the internal surface of said torus and adjacent, abutting rings of said tubing being integrally bonded to each other throughout a major portion of their length so that the structural strength of said bonded rings of tubing contribute to the ability of the torus to withstand internal pressure, fitting means to accommodate the admission of fluid under pressure to the interior of said tubing, pressure regulating means to accommodate the controlled discharge of fluid from within said tubing to the interior of said torus and normally closed fitting means to accommodate the discharge of fluid from said container to the exterior thereof.

3. A pressure tank for a portable flame thrower for military use comprising a torus formed of thin sheet metal and having an axis and an outer diameter approximating the width of a man's body so that it may be carried on a man's back with the axis of the torus extending normal to the man's back, a layer of tubing coiled within said torus in abutting relationship with substantially the entire internal surface of said torus, said tubing being arranged in successive and abutting rings each of which is concentric with respect to said axis, said tubing throughout a major portion of its length being integrally bonded to the internal surface of said torus and adjacent, abutting rings of said tubing being integrally bonded to each other throughout a major portion of their length so that the structural strength of said bonded rings of tubing contribute to the ability of the torus to withstand internal pressure, a fitting means accessible from the exterior of said torus for admitting air under pressure to said tubing, a pressure regulator to control the discharge of air from said tubing to the interior of said torus, and normally closed fitting means accessible from the exterior of said torus to accommodate the admission of napalm to and discharge of napalm from said torus.

4. A pressure tank for a portable flame thrower for military use comprising a torus formed of thin sheet metal and having an axis and an outer diameter approximating the width of a man's body so that it may be carried on a man's back with the axis of the torus extending normal to the man's back, a layer of tubing coiled within said torus in abutting relationship with substantially the entire internal surface of said torus, said tubing being arranged in successive and abutting rings each of which is concentric with respect to said axis, said tubing throughout a major portion of its length being integrally bonded to the internal surface of said torus and adjacent, abutting rings of said tubing being integrally bonded to each other throughout a major portion of their length so that the structural strength of said bonded rings of tubing contribute to the ability of the torus to withstand internal pressure, a fitting means accessible from the exterior of said torus for admitting air under pressure to said tubing, a pressure regulator to control the discharge of air from said tubing to the interior of said torus, and fitting means accessible from the exterior of said torus to accommodate the admission of napalm to and discharge of napalm from said torus, said last mentioned fitting means being located on one side of a plane normal to said axis and containing the major diameter of said torus so that the torus may be carried on a man's back with the said fitting means in close proximity to his back in order that his back and the torus may be inclined toward a horizontal position and the air in said torus outside of said tubes will bubble to the top of the napalm and be located at a position remote from said fitting means.

5. In a unitary pressure vessel having a normally closed first chamber adapted to contain a fluid under high pressure and a normally closed second chamber adapted to contain a fluid under a relatively lower pressure, outer sheet metal wall structure defining the exterior surface of said vessel, tubing coiled in successive rings in abutting relationship with each other and with the inner surface of said sheet metal wall structure with the interior of said tubing defining the above mentioned first chamber, each ring of said coiled tubing being integrally bonded to adjacent rings thereof and to said sheet metal wall structure so that the tubing in addition to providing a first chamber in the interior thereof serves to strengthen said wall structure, said sheet metal wall structure and said coiled tubing cooperating to form a central cavity serving as the above mentioned second chamber in said vessel, valve means forming a normally closed restriction between said first and second chambers, and valve means forming a normally closed outlet from said cavity to the exterior of said vessel.

6. In a portable unitary pressure vessel having a normally closed first chamber adapted to serve as a storage space for a fluid under high pressure and a normally closed second chamber adapted to serve as a storage space for a fluid under a relatively lower pressure, outer sheet metal wall structure defining the exterior surface of said vessel, tubing coiled in successive rings in abutting relationship with each other and with the inner surface of said sheet metal wall structure with the interior of said tubing defining the above mentioned first chamber, each ring of said coiled tubing being integrally bonded to adjacent rings thereof and to said sheet metal wall structure so that the tubing in addition to providing a first chamber in the interior thereof serves to strengthen said wall structure, said sheet metal wall structure and said coiled tubing cooperating to form a central cavity serving as the above mentioned second chamber in said vessel, the aforementioned central cavity having circular cross sections of substantially uniform diameter throughout the extent thereof, valve means forming a normally closed restriction between said first and second chambers, and valve means forming a normally closed outlet from said cavity to the exterior of said vessel.

7. A pressure tank comprising a thin sheet wall structure defining a closed container, a layer of tubing coiled in abutting relationship with said wall structure over substantially the entire surface area of the inner side of said wall structure, said tubing being arranged in successive rings positioned in close proximity to each other, said tubing throughout a major portion of its length being integrally bonded to said inner side of said wall structure so that the structural strength of said rings of tubing which are bonded to said wall structure contribute to the ability of the container to withstand internal pressure, fitting means to accommodate the admission of fluid under pressure to the interior of said tubing, pressure regulating means to accommodate the controlled discharge of fluid from within said tubing to the interior of said container and fitting means to accommodate the discharge of fluid from said container to the exterior thereof.

8. In a unitary pressure vessel having a normally closed first chamber adapted to contain a fluid under high pressure and a normally closed second chamber adapted to contain a fluid under a relatively lower pressure, outer sheet metal wall structure defining the exterior surface of said vessel, tubing coiled in successive rings in abutting relationship with the inner surface of said sheet metal wall structure with the interior of said tubing defining the above mentioned first chamber, each ring of said coiled tubing being integrally bonded to said sheet metal wall structure so that the tubing in addition to providing a first chamber in the interior thereof serves to strengthen said wall structure, said sheet metal wall structure and said coiled tubing cooperating to form a central cavity serving as the above mentioned second chamber in said vessel, valve means forming a normally closed restriction between said first and second chambers, and valve means forming a normally closed outlet from said cavity to the exterior of said vessel.

References Cited in the file of this patent

UNITED STATES PATENTS

| 595,323 | Lychenheim | Dec. 14, 1897 |
| 1,556,032 | Ritter | Oct. 6, 1925 |
| 2,053,127 | Biggs | Sept. 1, 1936 |
| 2,061,642 | Williamson | Nov. 24, 1936 |
| 2,366,140 | Alderfer | Dec. 26, 1944 |
| 2,406,926 | Summerfield | Sept. 3, 1946 |

FOREIGN PATENTS

| 459,924 | Great Britain | Jan. 18, 1937 |